United States Patent Office 3,086,867

Patented Apr. 23, 1963

3,086,867

PROCESS OF PREPARING A QUICK-COOKING BROWN RICE

Frederick J. Miller, Bogota, N.J., assignor to General Foods Corporation, White Plains, N.Y., a corporation of Delaware No Drawing. Filed Feb. 12, 1960, Ser. No. 8,247
6 Claims. (Cl. 99—80)

This invention relates to a process for preparing a quick-cooking, dry, brown rice product.

It is well known that brown rice is far superior to white milled rice nutritionally. Raw brown rice provides more B vitamins, protein, fat, fiber, calcium, phosphorous, iron, sodium, and other minerals than raw milled white rice. Thus, brown rice is far more desirable as an item in the diet than white milled rice.

Raw rice is marketed without removal of its bran coat as brown rice. The rice grains are hard, dense and opaque having a moisture content of about 6–18%. During cooking of such rice the starch is gelatinized and the moisture content of the grains increases to about 65–80%, the grains swelling to several times their original size and becoming soft and palatable. In order to make sure that the starch in the centers of the grains is properly cooked, however, relatively long cooking is required with the result that the starch at the grain surfaces becomes overcooked and the starch granules burst, discharging a sticky, pasty liquid. The surfaces of the grains are then pasty and unpalatable unless the starch paste is washed off with a resulting loss of nutritive constituents which may amount to as much as 30–40% by weight of the rice in the case of brown rice.

In order to avoid this undesirable surface overcooking, the cooking period must be controlled so that excessive losses do not occur. Processes for treating raw, milled white rice to render it quick-cooking are well known. All of these processes employ a series of water cooking and steam cooking steps in various combinations. However, none of these processes is suitable for the preparation of a quick-cooking brown rice as is evidenced by the lack of a suitable product on the store shelves.

Heretofore, numerous problems have been experienced in the preparation of a quick-cooking brown rice product which is suitable for use by the housewife. As normally prepared by the housewife, raw brown rice requires approximately 30–40 minutes in order to be ready for serving. The cooking procedure requires that the rice be boiled in an excess of moisture at temperatures of 212° F., or above in the case of pressure cooking. This cooking produces a product in which the starch granules have ruptured excessively. The product is pasty, unpalatable and has high solids losses and a low yield. Furthermore, if the housewife attempts to wash this pasty product to eliminate some of the pastiness, much of the nutritional value of the rice is lost.

In the past, attempts have been made to prepare a brown rice which would be suitable for use as a quick-cooking rice requiring less than 5–10 minutes' rehydration. However, no such rice has heretofore been made.

U.S. Patent No. 2,195,165 to Choppin et al, discloses a method for cooking rice in which hulled rice is employed. However, the Choppin process, while employing a hulled rice, does nothing more than prepare a parboiled rice which would require substantial cooking on the part of the consumer before the rice would be edible. The Choppin process is one in which the rice grains are cooked without causing the grains to burst open and lose their shape.

It is an object of the present invention to prepare a quick-cooking brown rice product which rehydrates in about five minutes merely by adding such product to boiling water, removing it from the heat and allowing it to stand. It is a further object of the present invention to prepare a brown rice product having yields far greater than those presently obtained by cooking as carried out in the household. Other objects of the present invention will be obvious from a reading of the specification.

It has now been found that a quick-cooking brown rice may be prepared by partially hydrating raw brown rice in water at a temperature above the gelatinization temperature of rice starch to increase its moisture content to 20–50% to partially split the bran coat, steaming the partially hydrated rice to partially gelatinize the grain surface and firm the grain to prevent solids losses, spraying water on the rice grains to increase the moisture content about 3–5%, steaming the treated rice grains to further partially gelatinize them, repeating the water spraying and steaming steps in stages until the rice is completely gelatinized and has a final moisture content of above 65%, and then drying the cooked, gelatinized grains by removing the moisture from their surface at a rate sufficiently faster than it can diffuse thereto from their interiors to set the grains in their enlarged condition and produce a porous structure therein.

While raw brown rice may be partially hydrated by water cooking until the moisture content reaches 20–50%, it is preferred that the rice be at a moisture content of 35–50% at the end of the water cook and even more preferably at a moisture content of 45%. At the preferred moisture content, that is above about 35%, the bran coat of the brown rice has partially split thereby faciliating the entry of water in subsequent processing. The split bran permits part of the starchy integument to be exposed to moisture. This starchy integument permits a much more rapid penetration of water than does the more water impervious bran coat and accordingly, processing times can be substantially reduced by such treatment. Furthermore, it has been found that moisture contents of substantially greater than 50% during the partial hydration stage of the process when using water cooking will result in an excessive solids loss in those areas of the rice grain where the bran coat has split. While it is possible that a product be obtained by hydration without water cooking, it is preferred that the water cooking step be employed so that the bran coat is split prior to treatment with steam. If the bran coat does not split during partial hydration by water cooking, a much greater period of time is required in the second processing step to obtain a product. Furthermore, under such less desirable conditions the product obtained is not uniform, some of the grains being hard, dense and undercooked whereas others are sticky, overcooked and the grains have ruptured. This results in a product which is pasty, unpalatable and has had undesirable solids losses.

It is essential that the rice grains, once the bran coat has split, do not come into contact with an excess of water since such excesses will merely result in increased solids losses due to leaching or washing away of the solids. This, of course, is undesirable nutritively as well as economically. Thus, cooking after the moisture content of the brown rice has exceeded 50% and at which time the bran coat will have split results in a low yield of product due to the high solids losses.

In the present invention the brown rice during partial hydration by water cooking should be cooked at a temperature of about 165°–212° F. or more and preferably at a temperature of about 210°–212° F. for about 7–11 minutes.

The partially hydrated rice having a split bran coat is then subjected to a series of steam and water treating cycles. The rice is first subjected to steam at a temperature of 212° F. or greater to partially gelatinize the surface and firm the grains to prevent subsequent solids losses. The steaming is carried out for about 1–6 minutes and preferably 4 minutes. After such period of time, the centers of the grains are still in a substantially ungelatinized, horny condition, only the surface starch having been gelatinized either partially or fully depending upon the degree of prior water cooking. The rice is now in condition to accept additional moisture without experiencing solids losses. The rice is subjected to a limited quantity of water having a temperature as close to 212° F. as is practical and preferably water at a temperature of about 205°–212° F. This permits the moisture content of the brown rice grain to increase about 3–5%. The period of time in which the rice is subjected to the spray of a limited quantity of water is preferably in the order of about 5–10 seconds although the period of time can be more or less, depending upon the length of time required to increase the moisture content of the rice to the desired 3–5%.

In carrying out the present invention the water treatment step is followed by a steaming step which lasts 1–6 and preferably 4 minutes, and these two steps are repeated until the moisture content of the rice has reached 65–80%. Preferably the cycle of water treatment followed by steam treatment is repeated four additional times until the moisture content of the rice has reached 70%. Thus, the process of the present invention permits a gradual increase in the moisture content of the rice grains at a rate no greater than that at which the rice is capable of absorbing moisture. Such a rate prevents the excessive losses which ordinarily result when the rice grains are subjected to an excess of moisture during processing.

While the cooked, completely gelatinized brown rice may be dried at this point, it is preferred to first wash and cool the rice. The cooked brown rice is washed with tap water to cool it, firm the grain surface and at the same time remove any free surface starch which is present. It is preferred to wash until the rice is cooled to a temperature of about 70° F. The washing and cooling step may in some cases increase the moisture content of the cooked, gelatinized rice about 1–2%.

The cooked rice is rapidly dried by a process such as that described in U.S. Patent No. 2,438,939 to Durrani. The rapid drying step removes moisture from the surface of the grains at a rate sufficiently faster than it can diffuse thereto from their interiors to set them in their enlarged condition and produce a porous structure therein. As a result of the split bran, the rice dries at a much faster rate than might be otherwise expected. This results from the fact that the bran coat is more impervious to moisture than is the starchy integument. At the time of drying about half of the surface area of the rice grain is comprised of starch integument and therefore the grains will dry much more rapidly.

Best drying results are obtained by spreading the moist rice on a supporting screen and blowing relatively dry heated air upwardly and downwardly through the rice, whereby the grains are agitated and separated to prevent matting and to insure thorough air circulation around each grain. With appropriate air velocity and humidity, drying may be carried out at room temperature but it is usually preferred to accelerate drying by heating the air, temperatures greater than about 350° F. being avoided to prevent scorching of the rice. In most cases, it is sufficient to dry the rice to about 8–14% moisture but if desired, such rice may be dried to a lower figure.

As a result of its greater size, substantially uniform and complete gelatinization and greater porosity, the quick-cooking brown rice prepared in the above manner is superior upon rehydration to any such product prepared heretofore. In particular, the rice is rehydratable in as little as 5 minutes and the rehydrated or cooked rice also has greater bulk volume, is fluffier and softer and as a result more palatable than similar products heretofore produced; it is also less pasty and substantially devoid of tough, chewy centers; furthermore, upon rehydration, the product takes up a greater volume of water and its moisture content closely approaches that of the precooked rice prior to drying.

Furthermore, rice having the above described desirable characteristics is obtained according to the process of this invention without the attendant disadvantages of excessive losses of nutrient material due to surface overcooking or the losses due to the excessive breakage.

As a specific example of this invention, 1000 pounds of raw Century Patna brown rice having a moisture content of 10% was cooked in water at a temperature of 210° F. for 11 minutes. The moisture content at the end of the cooking step was 49%.

The rice was then placed on a moving wire mesh belt which took 25 minutes to pass through a 60 foot chamber. The chamber had steam headers located below the belt which at spaced intervals subjected the rice to steam. As the rice entered the chamber it was subjected to steam for about 4 minutes after which time it was sprayed with a limited quantity of water at a temperature of 207° F. for about 5 seconds to increase the moisture content of the rice 3 to 5%. The amount of water employed was sufficient to wet the grain surfaces but insufficient to cause an excessive amount of surface water run-off. The rice was then again subjected to steam for 4 additional minutes and the water-steam cycle was repeated four additional times. At the end of this treatment, the rice was then cooled and washed in an excess of tap water at a temperature of about 65°–70° F. until the rice grains attained a temperature of about 70° F. The excess surface moisture was drained from the rice which was then placed on a moving wire mesh belt drier in a ¾–1 inch bed. The drier was 8 feet wide and 60 feet long and air passed through it at a lineal velocity of about 175 feet per minute. The drier had four sections; the air temperature in the first section was 340° F., the air temperature in the final section was 250° F., the two intermediate sections had temperatures ranging between the initial and final air temperatures. The rice passed through the drier in about 16 minutes and at the end of such time had a moisture content of about 10%.

The dried brown rice had a dry volume of 445 ml./5 oz. of rice which represented a yield of 85% based on the amount of raw rice processed. Five ounces of the rice were rehydrated in 320 milliliters of boiling water by pouring the rice into the boiling water, removing from the heat and allowing to stand for five minutes.

As is apparent from a reading of the specification, the desirable features of the present invention are obtained when the bran coat has been split prior to the hydration and gelatinization step. Prior splitting of the bran coat along the longitudinal axis of the rice grain permits the starchy integument upon expansion to force the bran coat farther apart greatly facilitating the rate at which the rice grain hydrates. As previously stated, when the bran coat is not split prior to hydration and gelatinization of the grain, a substantially longer period of time is required to process the grain and the resulting product is far less desirable. When the bran coat is not split initially as in the present invention the product is not uniform, some of the grains being hard, dense and undercooked while others are overcooked, have ruptured starch cells and are sticky. Such products are extremely difficult to process properly after hydration and gelatinization without experiencing very high yield losses and unsightly products.

By the term splitting of the bran coat as used in the present invention is meant the splitting which generally occurs along longitudinal axis on the ventral surface of the grain.

While the above invention has been described in part by means of a specific example, reference should be had to the appended claims for a definition of the scope of the invention.

What is claimed is:

1. A process for preparing a quick-cooking brown rice which comprises partially hydrating raw brown rice grains in water at a temperature above about 165° F. to increase their moisture content to 20–50% to partially split the bran coat, steaming the partially hydrated rice grains to partially gelatinize the grain surface and firm the grain thereby preventing solids losses, partially hydrating the rice grains in water to increase their moisture content about 3–5%, steaming the steamed and partially hydrated rice grains to further gelatinize them, subjecting the rice grains to additional cycles of partial hydration and steaming to increase the moisture content of the rice grains to above 65% and fully gelatinize them, and then drying the hydrated, gelatinized grains to a moisture content of less than about 14% by removing the moisture from their surfaces at a rate sufficiently faster than it can diffuse thereto from their interiors to set the grains in their enlarged condition and produce a porous structure therein.

2. A process of preparing a quick-cooking brown rice which comprises partially hydrating raw brown rice grains in water at a temperature above about 165° F. to increase their moisture content to 35–50% to partially split the bran coat, steaming the partially hydrated rice grains to partially gelatinize the grain surface and firm the grain thereby preventing solids losses, partially hydrating the rice grains in water to increase their moisture content about 3–5%, steaming the steamed and partially hydrated rice grains to further gelatinize them, subjecting the rice grains to additional cycles of partial hydration and steaming to increase the moisture content of the rice grains to above 65% and fully gelatinize them, and then drying the hydrated, gelatinized grains to a moisture content of less than about 14% by removing the moisture from their surfaces at a rate sufficiently faster than it can diffuse thereto from their interiors to set the grains in their enlarged condition and produce a porous structure therein.

3. A process of preparing a quick-cooking brown rice which comprises water cooking raw brown rice grains at a tempertaure of 165°–212° F. to increase their moisture content to 35–50% to partially split the bran coat, steaming the partially hydrated rice grains for 1–6 minutes to partially gelatinize the grain surface and firm the grain thereby preventing solids losses, spraying the rice grains with limited quantities of water for 5–10 seconds to increase their moisture content about 3–5%, steaming the steamed and sprayed rice grains to further gelatinize them, subjecting the rice grains to additional cycles of water spraying and steaming to increase the moisture content of the rice grains to 65–80%, and then drying the hydrated, gelatinized grains to a moisture content of less than about 8–14% by removing the moisture from their surfaces at a rate sufficiently faster than it can diffuse thereto from their interiors to set the grains in their enlarged condition and produce a porous structure therein.

4. The process according to claim 3 wherein the water spraying and steaming cycle is repeated four additional times and the moisture content of the rice is 70%.

5. The process according to claim 4 wherein the hydrated, gelatinized rice is washed and cooled prior to drying.

6. A process of preparing a quick-cooking brown rice which comprises water cooking raw brown rice grains at a temperature of 210°–212° F. for 7 to 11 minutes to increase their moisture content to 45% to partially split the bran coat, steaming the partially hydrated rice grains for 4 minutes to partially gelatinize the grain surface and firm the grain thereby preventing solids losses, spraying the rice grains with limited quantities of water at a temperature of 205°–212° F. for 5–10 seconds to increase their moisture content about 3–5%, steaming the steamed and sprayed rice grains to further gelatinize them, subjecting the rice grains to additional cycles of water spraying and steaming to increase the moisture content of the rice grains to 70%, washing and cooling the hydrated, gelatinized grains, and then drying the hydrated, gelatinized grains to a moisture content of less than about 8–14% by removing the moisture from their surfaces at a rate sufficiently faster than it can diffuse thereto from their interiors to set the grains in their enlarged condition and produce a porous structure therein.

References Cited in the file of this patent

UNITED STATES PATENTS

| | | |
|---|---|---|
| 2,195,165 | Choppin et al. | Mar. 26, 1940 |
| 2,438,939 | Ozai-Durrani | Apr. 6, 1948 |
| 2,720,460 | Flynn et al. | Oct. 11, 1955 |
| 2,828,209 | Hollis et al. | Mar. 25, 1958 |
| 2,937,946 | Ozai-Durrani | May 24, 1960 |